US009895658B2

(12) United States Patent
Fukuda et al.

(10) Patent No.: US 9,895,658 B2
(45) Date of Patent: Feb. 20, 2018

(54) AIR POLLUTION CONTROL SYSTEM AND AIR POLLUTION CONTROL METHOD

(71) Applicant: MITSUBISHI HITACHI POWER SYSTEMS, LTD., Yokohama-shi, Kanagawa (JP)

(72) Inventors: Toshihiro Fukuda, Tokyo (JP); Seiji Kagawa, Tokyo (JP); Naoyuki Kamiyama, Tokyo (JP); Yoshito Tanaka, Tokyo (JP); Takuro Soeda, Tokyo (JP); Jun Satou, Tokyo (JP); Nobuyuki Ukai, Tokyo (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 0 days.

(21) Appl. No.: 14/762,296

(22) PCT Filed: Jan. 24, 2014

(86) PCT No.: PCT/JP2014/051574
§ 371 (c)(1),
(2) Date: Jul. 21, 2015

(87) PCT Pub. No.: WO2014/115854
PCT Pub. Date: Jul. 31, 2014

(65) Prior Publication Data
US 2015/0375166 A1    Dec. 31, 2015

(30) Foreign Application Priority Data

Jan. 24, 2013   (JP) ................................. 2013-011532

(51) Int. Cl.
*B01D 53/50*       (2006.01)
*B01D 53/79*       (2006.01)
(Continued)

(52) U.S. Cl.
CPC ............. *B01D 53/505* (2013.01); *B01D 1/18* (2013.01); *B01D 21/24* (2013.01); *B01D 33/048* (2013.01);
(Continued)

(58) Field of Classification Search
None
See application file for complete search history.

(56) References Cited

U.S. PATENT DOCUMENTS

| 4,377,414 A * | 3/1983 | Buschmann ..........  C04B 18/021 |
| | | 106/709 |
| 4,614,645 A | 9/1986 | Yoneda et al. |
| 2012/0240761 A1* | 9/2012 | Ukai ........................ B01D 1/14 |
| | | 95/16 |

FOREIGN PATENT DOCUMENTS

JP          60-41529 A          3/1985
JP          9-313881 A          12/1997
(Continued)

OTHER PUBLICATIONS

International Search Report dated Apr. 22, 2014, issued in counterpart application No. PCT/JP2014/051574 (3 pages).
(Continued)

*Primary Examiner* — Sheng H Davis
(74) *Attorney, Agent, or Firm* — Westerman, Hattori, Daniels & Adrian, LLP

(57) ABSTRACT

Provided is an air pollution control system including: a denitration apparatus; an air heater; a precipitator; a desulfurization apparatus; a dehydrator; a spray drying apparatus provided with a spray unit that is configured to spray dehydrated filtrate supplied from the dehydrator; a flue gas introduction line through which a branch gas branched from the flue gas is introduced to the spray drying apparatus; a flue gas supply line through which a flue gas from the spray drying apparatus returns to a main flue gas duct; a solid
(Continued)

content separator that performs a solid-gas separation on solid contents contained in the flue gas; and a kneader that performs kneading and immobilizing treatment on the separated solid contents together with an immobilization aid.

4 Claims, 9 Drawing Sheets

(51) Int. Cl.
| | |
|---|---|
| F26B 3/12 | (2006.01) |
| C02F 9/00 | (2006.01) |
| F23J 15/00 | (2006.01) |
| F23J 15/02 | (2006.01) |
| F23J 15/04 | (2006.01) |
| B01D 53/75 | (2006.01) |
| B01D 53/80 | (2006.01) |
| B01D 53/86 | (2006.01) |
| B01D 1/18 | (2006.01) |
| B01D 21/24 | (2006.01) |
| B01D 33/048 | (2006.01) |
| B04B 5/00 | (2006.01) |
| C02F 1/12 | (2006.01) |
| C02F 1/28 | (2006.01) |
| C02F 1/42 | (2006.01) |
| C02F 1/56 | (2006.01) |
| C02F 11/12 | (2006.01) |
| C02F 11/14 | (2006.01) |

(52) U.S. Cl.
CPC ............ *B01D 53/75* (2013.01); *B01D 53/79* (2013.01); *B01D 53/80* (2013.01); *B01D 53/8631* (2013.01); *B04B 5/00* (2013.01); *C02F 9/00* (2013.01); *F23J 15/003* (2013.01); *F23J 15/006* (2013.01); *F23J 15/025* (2013.01); *F23J 15/04* (2013.01); *F26B 3/12* (2013.01); *B01D 2251/404* (2013.01); *B01D 2258/0283* (2013.01); *C02F 1/12* (2013.01); *C02F 1/28* (2013.01); *C02F 1/42* (2013.01); *C02F 1/56* (2013.01); *C02F 11/12* (2013.01); *C02F 11/14* (2013.01); *F23J 2219/20* (2013.01); *F23J 2219/40* (2013.01); *Y02P 70/40* (2015.11)

(56) References Cited

FOREIGN PATENT DOCUMENTS

| | | |
|---|---|---|
| JP | 10-137540 A | 5/1998 |
| JP | 2012196638 A | 10/2012 |
| WO | 2012/128257 A1 | 9/2012 |

OTHER PUBLICATIONS

Written Opinion of the International Searching Authority dated Apr. 22, 2014, issued in counterpart application No. PCT/JP2014/051574 (6 pages).
Written Opinion of the International Searching Authority dated Apr. 22, 2014, issued in counterpart application No. PCT/JP2014/051574 (8 pages).
Decision of a Patent Grant dated Jan. 4, 2017, issued in counterpart Japanese Patent Application No. 2014-558635, with English translation. (5 pages).

* cited by examiner

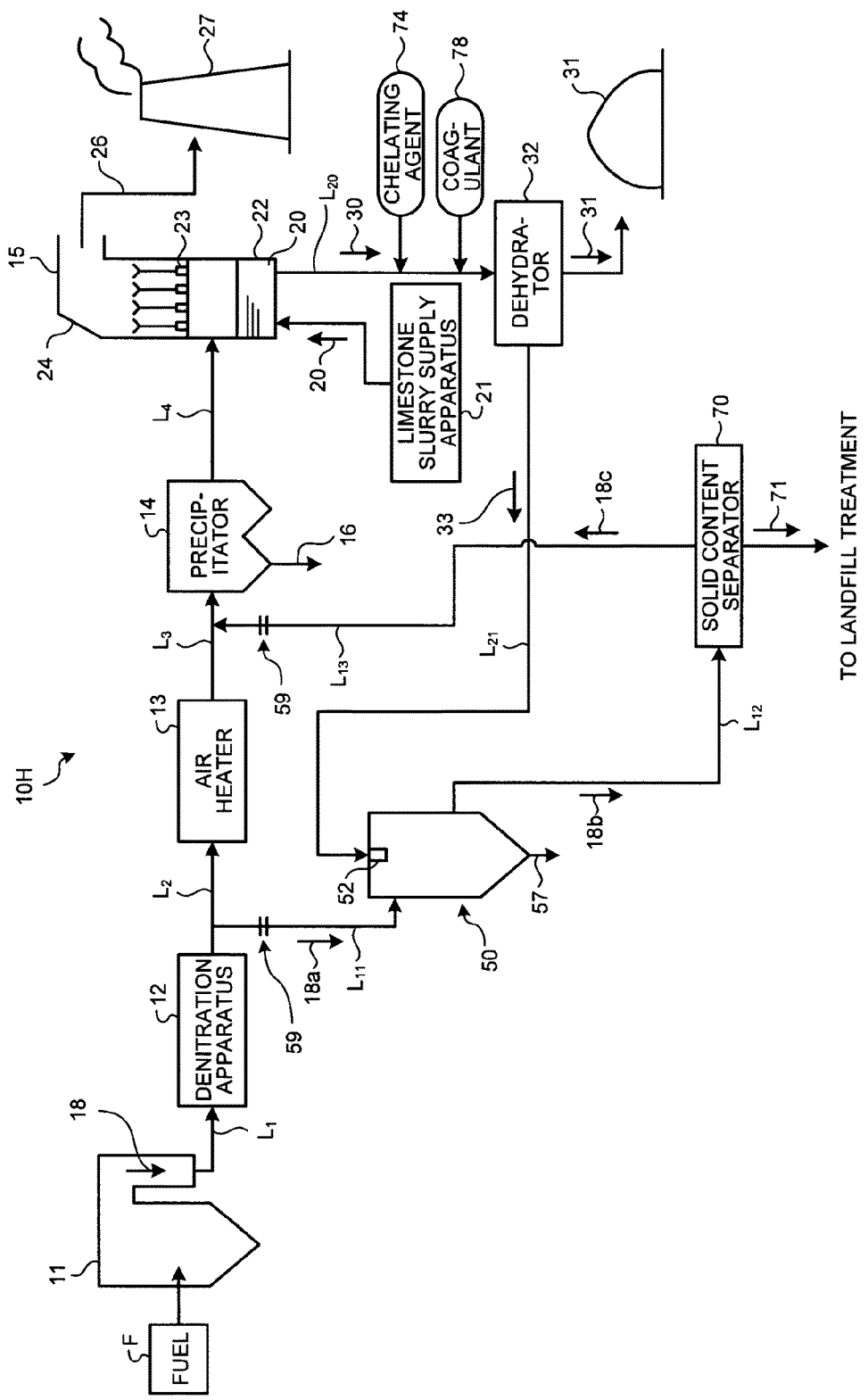

AIR POLLUTION CONTROL SYSTEM AND AIR POLLUTION CONTROL METHOD

FIELD

The present invention relates to an air pollution control system and an air pollution control method for treating a flue gas discharged from a boiler.

BACKGROUND

In the past, there has been known an air pollution control system that treats a flue gas discharged from a boiler installed in a thermal power facility or the like. The air pollution control system includes a denitration apparatus that removes nitrogen oxides from the flue gas discharged from the boiler, an air heater that recovers heat of the flue gas having passed through the denitration device, a precipitator that removes soot and dust contained in the flue gas after heat recovery, and a desulfurization apparatus that removes sulfur oxides contained in the flue gas after dust removal. As the desulfurization apparatus, a wet desulfurization apparatus is generally used, which removes sulfur oxides contained in a flue gas by bringing a limestone absorbent or the like into gas-liquid contact with the flue gas.

Recently, due to enhancement of wastewater regulation, elimination of wastewater in an air pollution control facility has been earnestly desired and an advent of an air pollution control facility for achieving the elimination of wastewater has been earnestly desired in which an operation can be stably performed.

As a facility for performing the elimination of wastewater, the applicant has previously proposed a technique in which a spray drying apparatus is used to dry filtrate obtained by separating gypsum from absorbent slurry as desulfurization wastewater and the desulfurization wastewater is spray-dried using a boiler flue gas (Patent Literature 1).

CITATION LIST

Patent Literature

Patent Literature 1: JP 2012-196638 A

SUMMARY

Technical Problem

Meanwhile, in a case of realizing the elimination of wastewater using a spray drying apparatus which is configured to partially branch a boiler flue gas from a flue gas duct and to spray and gasify filtrate from a desulfurization apparatus, the spray drying apparatus for completely evaporating and solidifying the sprayed filtrate is essential.

In the spray drying apparatus, the filtrate is completely dried, but there is a problem that dry salts to be generated have salts (for example, calcium chloride) dissolved in the desulfurization wastewater in the desulfurization apparatus as a main component and thus are easily re-dissolved.

In addition, since the dry salts are contained in collected dust ash, there are problems that a dust collection load of a precipitator becomes higher and it is necessary to increase the capacity of the precipitator.

For this reason, in a case of performing a landfill treatment on waste matter including the dry salts, it is preferable to perform an immobilization treatment or an insolubilization treatment on the waste matter.

The present invention has been made in view of the above problems and an object thereof is to provide an air pollution control system and an air pollution control method which reliably treats the dry salts to be generated at the time of performing the elimination of wastewater on the desulfurization wastewater discharged from the desulfurization apparatus.

Solution to Problem

According to a first aspect of the present invention in order to solve the above-mentioned problems, there is provided An air pollution control system including: a boiler that is configured to combust a fuel; an air heater that is configured to recover heat of a flue gas discharged from the boiler; a precipitator that is configured to remove soot and dust contained in the flue gas after heat recovery; a desulfurization apparatus that is configured to remove sulfur oxides contained in the flue gas after dust removal, using an absorbent; a dehydrator that is configured to remove gypsum from absorbent slurry discharged from the desulfurization apparatus; a spray drying apparatus that is provided with a spray unit which is configured to spray filtrate supplied from the dehydrator; a flue gas introduction line through which some of a branch gas branched from the flue gas is introduced to the spray drying apparatus from a main flue gas duct; a flue gas supply line through which the flue gas returns to the main flue gas duct, the flue gas being obtained after the filtrate is dried by the spray drying apparatus; a solid content separator that is provided at the flue gas supply line and performs a solid-gas separation on solid contents contained in the flue gas; a kneader that performs kneading and immobilizing treatment on the separated solid contents together with an immobilization aid; and a dryer that performs a drying treatment on a kneaded matter.

According to a second aspect of the present invention, there is provided the air pollution control system according to the first aspect, wherein the immobilization aid is any one or a mixture of collected dust ash, calcium oxide, calcium carbonate, calcium sulfate, or a cement material.

According to a third aspect of the present invention, there is provided the air pollution control system according to second aspect, wherein at least one of a chelating agent, a coagulant, or an absorbing agent is added together with or instead of the immobilization aid.

According to a fourth aspect of the present invention, there is provided an air pollution control system including: a boiler that is configured to combust a fuel; an air heater that is configured to recover heat of a flue gas discharged from the boiler; a precipitator that is configured to remove soot and dust contained in the flue gas after heat recovery; a desulfurization apparatus that is configured to remove sulfur oxides contained in the flue gas after dust removal, using an absorbent; a dehydrator that is configured to remove gypsum from absorbent slurry discharged from the desulfurization apparatus; a spray drying apparatus that is provided with a spray unit which is configured to spray filtrate supplied from the dehydrator; a chelating agent adding portion that is configured to add a chelating agent into the filtrate; a flue gas introduction line through which some of a branch gas branched from the flue gas is introduced to the spray drying apparatus from a main flue gas duct; a flue gas supply line through which a flue gas returns to the main flue gas duct, the flue gas being obtained after the filtrate is dried by the spray drying apparatus; and a solid content separator that is provided at the flue gas supply line and performs a solid-gas separation on solid contents contained in the flue gas.

According to a fifth aspect of the present invention, there is provided an air pollution control system including: a boiler that is configured to combust a fuel; an air heater that is configured to recover heat of a flue gas discharged from the boiler; a precipitator that is configured to remove soot and dust contained in the flue gas after heat recovery; a desulfurization apparatus that is configured to remove sulfur oxides contained in the flue gas after dust removal, using an absorbent; a chelating agent adding portion that is configured to add a chelating agent to absorbent slurry discharged from the desulfurization apparatus; a dehydrator that is configured to remove gypsum and heavy metal immobilization matter from the absorbent slurry; a spray drying apparatus that is provided with a spray unit which is configured to spray filtrate supplied from the dehydrator; a flue gas introduction line through which some of a branch gas branched from the flue gas is introduced to the spray drying apparatus from a main flue gas duct; a flue gas supply line through which the flue gas returns to the main flue gas duct, the flue gas being obtained after the filtrate is dried by the spray drying apparatus; and a solid content separator that is provided at the flue gas supply line and performs a solid-gas separation on solid contents contained in the flue gas.

According to a sixth aspect of the present invention, there is provided the air pollution control system according to the fourth or fifth aspect, wherein a coagulant or an absorbing agent is added together with or instead of the chelating agent.

According to a seventh aspect of the present invention, there is provided an air pollution control method in which after heat of a flue gas discharged from a boiler configured to combust a fuel is recovered by an air heater, sulfur oxides contained in the flue gas after heat recovery are removed using an absorbent in a desulfurization apparatus, the method including: performing spray-drying on filtrate, which is obtained by removing gypsum from absorbent slurry discharged from the desulfurization apparatus, using some of the flue gas; performing a solid-gas separation on solid contents contained in the flue gas after the dry treatment; and subsequently performing kneading and immobilizing treatments on the solid contents with an immobilization aid.

According to an eighth aspect of the present invention, there is provided the air pollution control method according to the seventh aspect, wherein the immobilization aid is any one or a mixture of collected dust ash, calcium oxide, calcium carbonate, calcium sulfate, or a cement material.

According to a ninth aspect of the present invention, there is provided the air pollution control method according to the eighth aspect, wherein at least one of a chelating agent, a coagulant, or an absorbing agent is added together with or instead of the immobilization aid.

According to a tenth aspect of the present invention, there is provided an air pollution control method in which after heat of a flue gas discharged from a boiler configured to combust a fuel is recovered by an air heater, sulfur oxides contained in the flue gas after heat recovery are removed using an absorbent in a desulfurization apparatus, the method including: adding a chelating agent to filtrate, which is obtained by removing gypsum from absorbent slurry discharged from the desulfurization apparatus, and subsequently performing spray-drying on the filtrate using some of the flue gas; and performing a solid-gas separation on the solid contents contained in the flue gas after the dry treatment.

According to an eleventh aspect of the present invention, there is provided the air pollution control method in which after heat of a flue gas discharged from a boiler configured to combust a fuel is recovered by an air heater, sulfur oxides contained in the flue gas after heat recovery are removed using an absorbent in a desulfurization apparatus, the method including: adding a chelating agent to absorbent slurry discharged from the desulfurization apparatus, and subsequently separating gypsum and heavy metal immobilization matter from the absorbent slurry; performing spray-drying on the filtrate after the separation using some of the flue gas; and performing a solid-gas separation on the solid contents contained in the flue gas after the dry treatment.

According to a twelfth aspect of the present invention, there is provided the air pollution control method according to the tenth or eleventh aspect, wherein a coagulant or an absorbing agent is added together with or instead of the chelating agent.

Advantageous Effects of Invention

According to the present invention, since the immobilization treatment is performed on the dry salts to be generated when the filtrate separated from the absorbent slurry is sprayed by the spray drying apparatus, the dissolution of the dry salts is reduced even at the time of the landfill treatment and the soil contamination due to the elution of hazardous substances can be prevented. In addition, it is possible to reduce the increase in capacity of the precipitator.

BRIEF DESCRIPTION OF DRAWINGS

FIG. 9 is a schematic configuration diagram of an air pollution control system according to a fifth embodiment.

DESCRIPTION OF EMBODIMENTS

Preferred embodiments of the invention will be described in detail below with reference to the accompanying drawings. Meanwhile, the invention is not limited by these embodiments. Further, when the invention includes a plurality of embodiments, the invention also includes the combination of the respective embodiments.

First Embodiment

Figure 1:
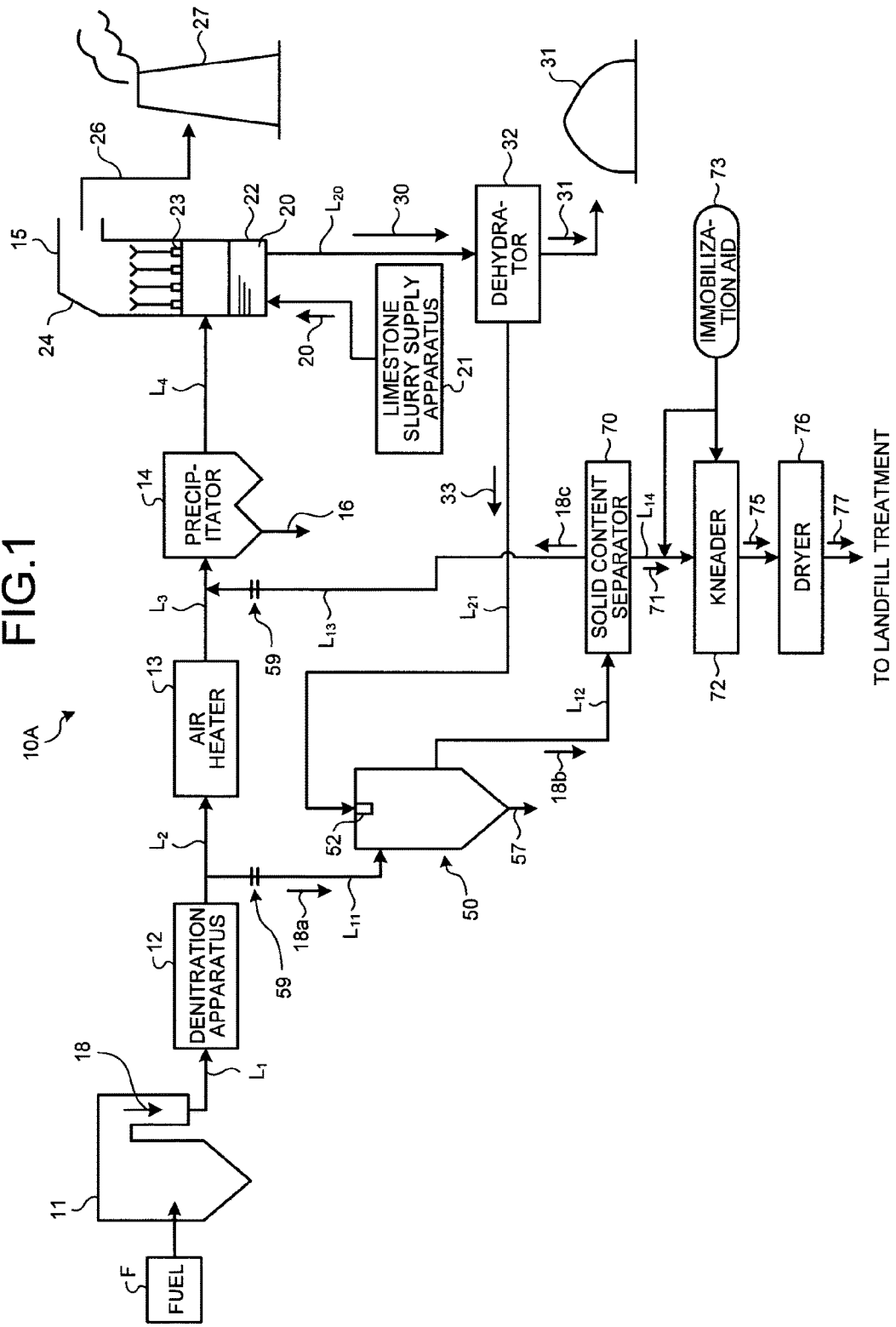
FIG. 1 is a schematic configuration diagram of an air pollution control system according to a first embodiment.

FIG. 1 is a schematic configuration diagram of an air pollution control system according to a first embodiment. An air pollution control system 10A exemplified in FIG. 1 is a plant which removes hazardous substances such as nitrogen oxides ($NO_x$), sulfur oxides ($SO_x$), soot and dust (PM), or mercury (Hg) from boiler flue gas (hereinafter, referred to as "flue gas") 18 discharged from a boiler 11 such as a coal combustion boiler using, for example, coals or residual solid substances as a fuel or an oil combustion boiler using heavy oil or residual oil as a fuel.

An air pollution control system 10A according to the present embodiment includes a boiler 11 that is configured to combust a fuel F, a denitration apparatus 12 that is configured to remove nitrogen oxides in a flue gas 18 discharged from the boiler 11, an air heater 13 that is configured to recover heat of the flue gas 18 after denitration, a precipitator 14 that is configured to remove soot and dust contained in the flue gas 18 after heat recovery in the form of collected dust ash 16, a desulfurization apparatus 15 that is configured to remove sulfur oxides contained in the flue gas 18 after dust removal using limestone slurry 20 which is an absorbent, a dehydrator 32 that is configured to recover gypsum 31 from absorbent slurry 30 discharged from the desulfurization apparatus 15, a spray drying apparatus 50 provided with a spray unit that is configured to spray filtrate 33 supplied from the dehydrator 32, a flue gas introduction line $L_{11}$ through which a branch gas 18a branched from the flue gas 18 is introduced to the spray drying apparatus 50, flue gas supply lines $L_{12}$ and $L_{13}$ through which flue gas 18b returns to a main flue gas duct, the flue gas 18b being obtained after the filtrate 33 is dried by the spray drying apparatus 50, a solid content separator 70 that is provided between the flue gas supply line $L_{12}$ and the flue gas supply line $L_{13}$ and performs a solid-gas separation on solid contents contained in the flue gas 18b, a kneader 72 that performs kneading and immobilizing treatment on separated solid contents 71 together with an immobilization aid 73, and a dryer 76 that performs a drying treatment on a kneaded matter 75.

Thus, the spray drying apparatus 50 performs spray-drying on the filtrate 33, in which the gypsum 31 is recovered, using the branch gas 18a which is introduced thereto, and thus it is possible to stably perform the elimination of wastewater on the filtrate 33 which is desulfurization wastewater discharged from the desulfurization apparatus 15.

The denitration apparatus 12 is an apparatus that removes nitrogen oxides contained in the flue gas 18 supplied from the boiler 11 through a gas supply line $L_1$ and includes a denitration catalyst layer (not illustrated) therein. A reducing agent injector (not illustrated) is disposed on a front stream side of the denitration catalyst layer, and a reducing agent is injected into the flue gas 18 from the reducing agent injector. Here, for example, ammonia, urea, or ammonium chloride is used as the reducing agent. The nitrogen oxides contained in the flue gas 18 introduced to the denitration apparatus 12 comes into contact with the denitration catalyst layer, so that the nitrogen oxides contained in the flue gas 18 are decomposed into nitrogen gas ($N_2$) and water ($H_2O$) and removed. In addition, as the amount of chlorine (Cl) of the mercury contained in the flue gas 18 increases, the ratio of bivalent mercury chloride soluble in water increases and mercury is easily collected by the desulfurization apparatus 15 to be described below.

Meanwhile, the above-described denitration apparatus 12 is not essential, and when the concentration of the nitrogen oxide or mercury contained in the flue gas 18 discharged from the boiler 11 is low or when these substances are not contained in the flue gas 18, the denitration apparatus 12 may not be provided.

The air heater 13 is a heat exchanger that recovers the heat in the flue gas 18 which is supplied through a flue gas supply line $L_2$ after the nitrogen oxides are removed by the denitration apparatus 12. Since the temperature of the flue gas 18, which has passed through the denitration apparatus 12, is as high as about 300 to 400° C., heat exchange is performed between the high-temperature flue gas 18 and room-temperature combustion air by the air heater 13. Combustion air of which the temperature becomes high by the heat exchange is supplied to the boiler 11. Meanwhile, the flue gas 18, which is heat-exchanged with the room-temperature combustion air, is cooled to a temperature of about 150° C.

The precipitator 14 is to remove soot and dust contained in the flue gas 18, which is supplied through a gas supply line $L_3$, after the heat recovery. Examples of the precipitator 14 include an inertial precipitator, a centrifugal precipitator, a filtration-type precipitator, an electronic precipitator, a washing precipitator, but are not particularly limited thereto.

The desulfurization apparatus 15 is an apparatus that removes the sulfur oxides contained in the flue gas 18, which is supplied through a gas supply line $L_4$ after the soot and dust are removed, in a wet manner. For example, limestone slurry (an aqueous solution obtained by dissolving limestone powder in water) 20 is used as an alkaline absorbent in the desulfurization apparatus 15, and a temperature in the apparatus is adjusted to about 30 to 80° C., for example. The limestone slurry 20 is supplied to a liquid reservoir in a column bottom portion 22 of the desulfurization apparatus 15 from a limestone slurry supply apparatus 21. The limestone slurry 20, which is supplied to the column bottom portion 22 of the desulfurization apparatus 15, is fed to a plurality of nozzles 23 provided in the desulfurization apparatus 15 through an absorbent supply line (not illustrated) and is ejected from the nozzles 23 toward a column top portion 24. The flue gas 18 rising from the column bottom portion 22 of the desulfurization apparatus 15 comes into gas-liquid contact with the limestone slurry 20 ejected from the nozzles 23, so that the sulfur oxides and the mercury chlorides contained in the flue gas 18 are absorbed by the limestone slurry 20 and are separated and removed from the flue gas 18. The flue gas 18 purified by the limestone slurry 20 is discharged from the column top portion 24 of the desulfurization apparatus 15 as a purified gas 26 and is discharged from a stack 27 to the outside of the system.

In the interior of the desulfurization apparatus 15, the sulfur oxide $SO_x$ contained in the flue gas 18 reacts with the limestone slurry 20 as represented by the following Formula (1).

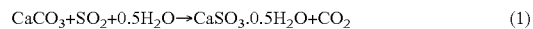
$$CaCO_3 + SO_2 + 0.5H_2O \rightarrow CaSO_3 \cdot 0.5H_2O + CO_2 \quad (1)$$

In addition, the limestone slurry 20, which has absorbed $SO_x$ contained in the flue gas 18, is oxidized by air (not illustrated) supplied to the column bottom portion 22 of the desulfurization apparatus 15 and reacts with the air as represented by the following Formula (2).

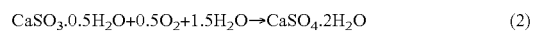
$$CaSO_3 \cdot 0.5H_2O + 0.5O_2 + 1.5H_2O \rightarrow CaSO_4 \cdot 2H_2O \quad (2)$$

In this way, the $SO_x$ contained in the flue gas 18 is captured in the form of gypsum $CaSO_4 \cdot 2H_2O$ in the desulfurization apparatus 15.

In addition, as described above, while a liquid, which is stored in the column bottom portion 22 of the desulfurization apparatus 15 and is pumped up, is used as the limestone slurry 20, the gypsum $CaSO_4 \cdot 2H_2O$ is mixed with the pumped limestone slurry 20 by Reaction Formulae (1) and (2) with the operation of the desulfurization apparatus 15. In the following description, limestone gypsum slurry (limestone slurry with which the gypsum has been mixed) to be pumped is referred to as an absorbent slurry.

The absorbent slurry (limestone gypsum slurry) 30 used for desulfurization is discharged to the outside from a column bottom portion 22 of the desulfurization apparatus 15 and is fed to the dehydrator 32 through an absorbent line $L_{20}$ to be dehydrated here. The filtrate 33 becomes desulfurization wastewater, but includes heavy metals such as mercury (Hg) and selenium (Se) or halogen ions such as $Cl^-$, $Br^-$, $I^-$, and $F^-$.

The dehydrator 32 is to separate a solid component containing the gypsum 31 of the absorbent slurry 30 from a liquid component of the filtrate 33. For example, a belt filter, a centrifugal separator, or a decanter-type centrifugal settler is used as the dehydrator 32. The gypsum 31 is separated from the absorbent slurry 30 discharged from the desulfurization apparatus 15, by the dehydrator 32. At this time, mercury chlorides contained in the absorbent slurry 30 are separated from liquid together with the gypsum 31 while being absorbed on the gypsum 31. The separated gypsum 31 is discharged outside of the system (hereinafter, referred to as an "outside of the system").

Meanwhile, the filtrate 33, which is a separate liquid from the dehydrator 32, is fed to the spray drying apparatus 50 to be evaporated and dried, and thus the elimination of wastewater is achieved.

In addition, the spray drying apparatus 50 includes a gas introduction unit to which the branch gas 18a branched from the flue gas 18 is introduced through the flue gas introduction line $L_{11}$ branched from the flue gas supply line $L_2$ which is a main line of the flue gas 18 supplied from the boiler 11 and a spray unit 52 which is configured to disperse or spray the filtrate 33 introduced through a filtrate introduction line $L_{21}$ from the dehydrator 32. Then, the dispersed or sprayed filtrate 33 is evaporated and dried by heat of the flue gas 18 to be introduced. Furthermore, reference numeral $L_{12}$ represents a flue gas supply line through which the flue gas 18b contributed to the drying in the spray drying apparatus 50 is introduced to the solid content separator 70 and reference numeral L13 represents a flue gas supply line through which a flue gas 18c returns to the gas supply line $L_3$, the flue gas 18c being obtained by separating the solid contents 71 with the solid content separator 70. A damper unit 59 is provided on the flue gas introduction line $L_{11}$ and the flue gas supply line $L_{1}3$ to stop inflow and discharge of the branch gas 18a and the flue gas 18c.

In the present embodiment, since the flue gas 18 flowing into the air heater 13 is branched from the flue gas supply line L2 through the flue gas introduction line $L_{11}$ as the branch gas 18a, the temperature of the gas is high (300 to 400° C.) and the spray-drying of the filtrate 33 can be efficiently performed.

Figure 3:
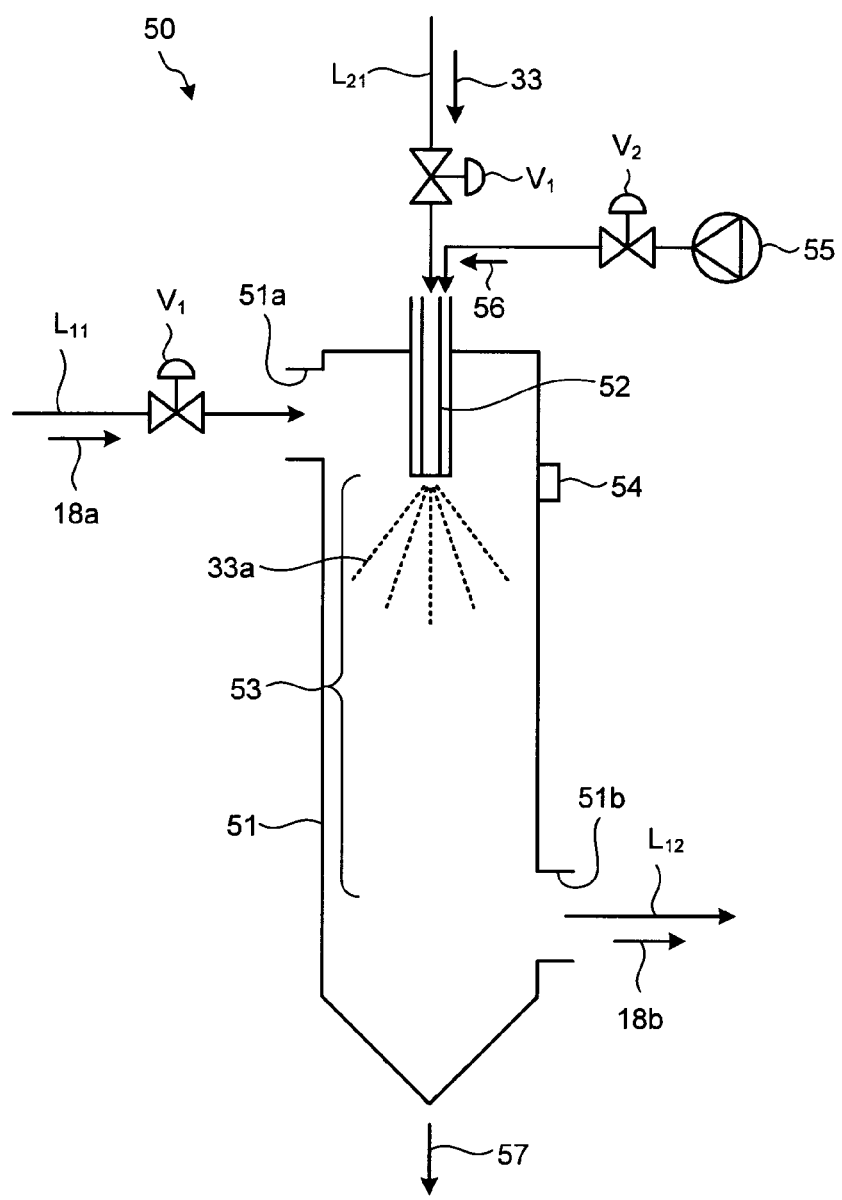
FIG. 3 is a schematic diagram of a spray drying apparatus for a filtrate according to the first embodiment.

FIG. 3 is a schematic diagram illustrating an example of the spray drying apparatus for the filtrate according to the present embodiment. As illustrated in FIG. 3, the spray drying apparatus 50 according to the present embodiment includes: the spray unit 52 which is provided in a spray drying apparatus body 51 to spray the filtrate 33; an inlet 51a which is provided in the spray drying apparatus body 51 and is configured to introduce the branch gas 18a for drying a spray liquid 33a; a drying zone 53 which is provided in the spray drying apparatus body 51 to dry the filtrate 33 using the branch gas 18a; an outlet 51b which discharges the flue gas 18b contributed to the drying; and a deposit monitoring unit 54 which monitors a state where a deposit is attached to the spray unit 52. Reference numeral 57 denotes a separated solid contents and reference numerals $V_1$ and $V_2$ denote flow regulating valves.

Incidentally, using the spray unit 52, the filtrate 33 is sprayed into the inside of the spray drying apparatus body 51 by air 56 supplied from a compressor 55 at a predetermined flow rate and with a predetermined particle size of sprayed droplets.

Here, as long as the spray unit 52 sprays the filtrate 33 in the form of sprayed droplets having a predetermined particle size, the type thereof is not limited. For example, a spray unit such as a two-fluid nozzle or a rotary atomizer may be used. The two-fluid nozzle is suitable to spray a relatively small amount of filtrate 33 and the rotary atomizer is suitable to spray a relatively large amount of filtrate 33.

In addition, the number of nozzles is not one, and a plurality of nozzles may be provided according to the amount of filtrate to be treated.

Here, since dissolved components (salts) dissolved in the desulfurization wastewater are contained in the flue gas 18b to be discharged from the spray drying apparatus 50 when being intactly dried by the spray drying apparatus 50, the dissolve components are contained in the collected dust ash 16 when being supplied and collected to/in the precipitator 14.

When the collected dust ash 16 containing the dissolved components is intactly subjected to a landfill treatment, the dissolved components from the collected dust ash 16 become a problem. In addition, dry salts are contained, and thus a dust collection load of the precipitator 14 is high and it is necessary to increase the capacity of the precipitator 14.

In the present embodiment, the flue gas 18b is treated so as not to produce the dissolved components even when the collected dust ash 16 is subjected to the landfill.

In the present embodiment, the solid content separator 70 is interposed in the flue gas supply line $L_{12}$ to perform the solid-gas separation on the solid contents 71 which are soluble dry salts contained in the flue gas 18b discharged from the spray drying apparatus 50.

An example of the solid content separator 70 is an apparatus such as a cyclone or a bag filter which separates solid contents contained in a gas, and the separated solid contents 71 are then sent to the kneader 72 and are kneaded therein.

In addition, the flue gas 18c from which the solid contents 71 are separated returns to the gas supply line $L_3$ through the flue gas supply line $L_{13}$.

In addition, since the separated solid contents 71 intactly contain water after the landfill and are re-dissolved in this state, they are subjected to a kneading treatment together with the immobilization aid 73 in the kneader 72 and are subjected to an immobilization treatment.

In the present embodiment, the solid contents 71 and the immobilization aid 73 are charged into the kneader 72 and are kneaded therein for a predetermined time, so that the solid contents 71 are subjected to the immobilization treatment.

Here, some of the immobilization aid 73 may be first charged to an extraction line $L_{14}$, through which the solid contents 71 are extracted from the solid content separator 70, and be transferred to the kneader 72.

This can reduce moisture contained in the solid contents 71 by mixing of the immobilization aid 73 even when a deliquescent material such as calcium chloride contained in the solid contents 71 absorbs water by temperature reduction and thus the moisture contained in the solid contents 71 is raised, resulting in causing adhesion or fixation. Thus, the solid contents 71 can be more reliably transferred to the kneader 72.

Here, the collected dust ash 16 recovered by the precipitator 14 can be used as the immobilization aid 73 for performing the immobilization treatment on the solid contents 71 to be easily dissolved.

The predetermined amount of collected dust ash 16 is added and kneaded to/with the kneader 72, so that a solidification treatment is reliably performed.

In addition, for example, calcium carbonate (limestone), calcium oxide, calcium sulfate (gypsum), or a cement material is added instead of the collected dust ash 16, and thus the immobilization treatment may be reliably performed.

Here, a combination of, for example, $3CaO.SiO_2$ and $3CaO.Al_2O_3$ is used as the cement material and more reliably immobilizes the dissolved components. As the cement material, for example, Portland cement can be exemplified.

As water used to solidify each component by dissolving and mixing it, for example, steam or wastewater (desulfurization wastewater or the like), industrial water, or desulfurization absorbent slurry can be appropriately used.

A kneaded matter 75 to which the immobilization aid 73 is charged is then dried by the dryer 76, resulting in becoming a dry matter 77. Although the dry matter 77 is separately subjected to the landfill treatment, since it has been subjected to the immobilization treatment at the time of the landfill, the dissolved components are not produced and the landfill treatment can be performed in consideration of an environment.

Thus, since the solid contents 71 are separated from the flue gas 18b contributed to the drying in the spray drying apparatus 50, the load on the precipitator 14 is also reduced and it is not necessary to increase the capacity of the precipitator 14.

In the present embodiment, although the dry matter 77 is formed in the dryer 76, the kneaded matter 75 may be dried after being formed using, for example, a forming machine at a pre-stage of the dryer 76.

In addition, the dry matter 77 may be formed using, for example, a forming machine at a post-stage of the dryer 76. This makes it possible to achieve the reduction in volume.

Second Embodiment

Figure 2:
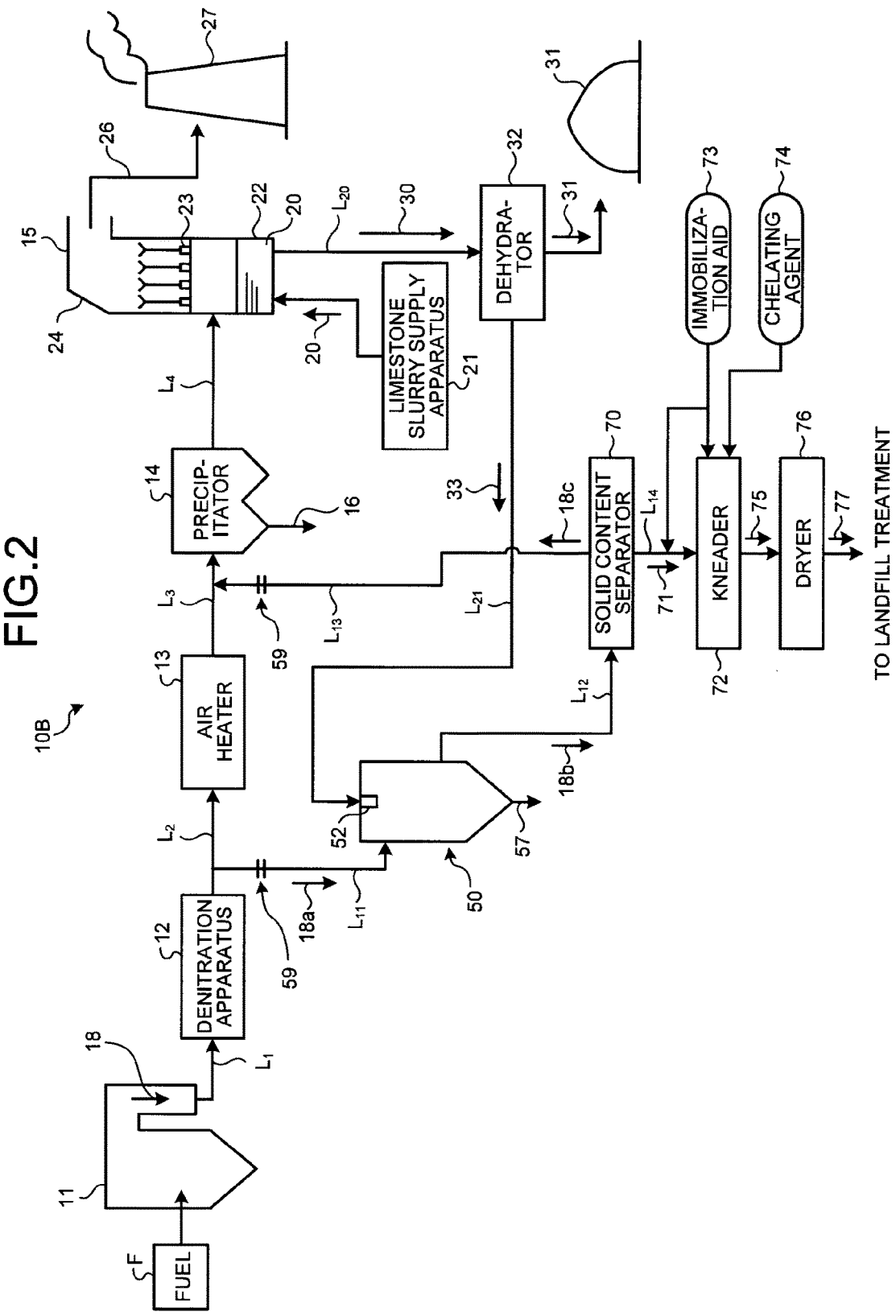
FIG. 2 is a schematic configuration diagram of an air pollution control system according to a second embodiment.

FIG. 2 is a schematic configuration diagram of an air pollution control system according to a second embodiment. The same members as those in the air pollution control system according to the first embodiment are denoted by the same reference numerals and the description thereof will not be presented.

In an air pollution control system 10B according to the present embodiment illustrated in FIG. 2, a chelating agent 74 is added and mixed together with or instead of the immobilization aid 73 in the kneader 72 by which the solidification treatment is performed.

As water used to solidify each component by dissolving and mixing it, for example, steam or wastewater (desulfurization wastewater or the like), industrial water, or desulfurization absorbent slurry can be appropriately used.

In addition, the chelating agent 74 is concurrently charged at the time of the kneading treatment to immobilize heavy metals contained in the solid contents 71. In addition, as the chelating agent 74 to be used, for example, an amino carboxylic acid-based chelating agent such as EDTA chelating agent can be used.

A kneaded matter 75 to which the immobilization aid 73 and the chelating agent 74 are charged is then dried by a dryer 76, resulting in becoming a dry matter 77.

In addition, since salt components dissolved in desulfurization wastewater are separated by a solid content separator 70 and the heavy metals are immobilized by the chelating agent 74, insolubilization of dry salts can be achieved and it is possible to prevent soil contamination due to elution of hazardous substances even when the dry salts are subjected to a landfill treatment.

Although the dry matter 77 is separately subjected to the landfill treatment, since it has been subjected to the immobilization treatment at the time of the landfill, the elution of the hazardous substances does not occur and the landfill treatment can be performed in consideration of an environment.

According to the present embodiment, since the dry salts generated in the spray drying apparatus 50 are subjected to the immobilization treatment using the immobilization aid 73 such as soot and dust and cement materials and the chelating agent 74, it is possible to immobilize the heavy metals and to perform an elution prevention (insolubilization) treatment.

Thus, the dry salts dried by the spray drying apparatus 50 are separated by the solid content separator 70 and the dry salts are immobilized, so that the insolubilization treatment is reliably performed. Accordingly, even when the dry matter 77 is subjected to the landfill treatment, the dissolution of the dry salts is reduced and the soil contamination due to the elution of the hazardous substance can be prevented.

Figure 4:
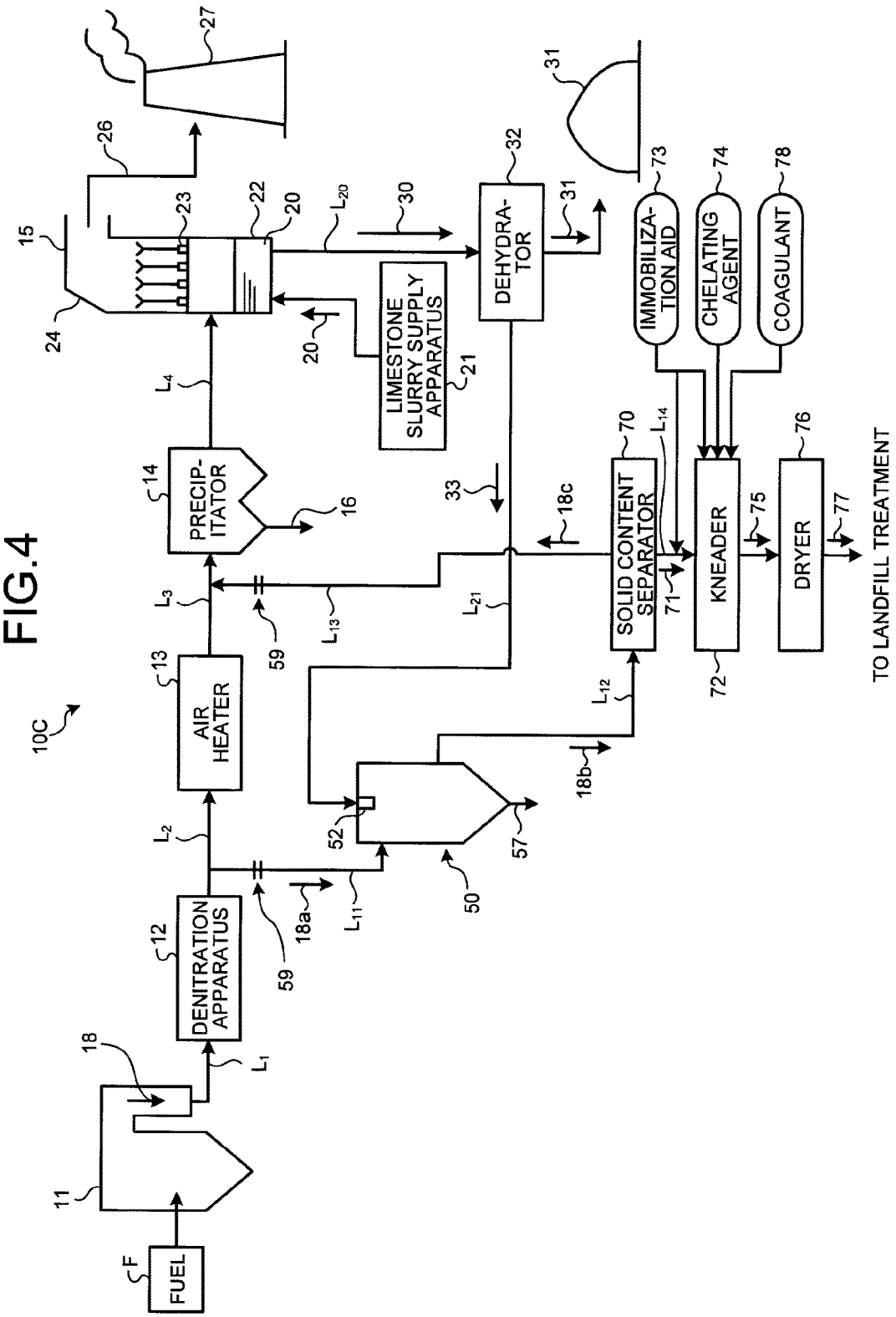
FIG. 4 is a schematic configuration diagram of another air pollution control system according to the second embodiment.

FIG. 4 is a schematic configuration diagram of another air pollution control system according to the second embodiment.

In an air pollution control system 10C illustrated in FIG. 4, a coagulant 78 such as an iron oxide, an aluminum compound, or a polymer coagulant may be further added and mixed together with the chelating agent 74 when the chelating agent 74 is added, or instead of the chelating agent 74 as in the second embodiment.

An example of the iron oxide may include iron (III) chloride, iron (III) hydroxide, or iron (II) sulfate.

An example of the aluminum compound may include polyaluminum chloride (PAC) or aluminum sulfate (sulfate band), and aluminum hydroxide.

An example of the polymer coagulant may include a "TAKIFLOC (trade name; manufactured by Taki Chemical Co., Ltd.) anionic, nonionic, cationic, or amphoteric)" and an "EPOFLOCK L-1 (trade name; manufactured by JIKCO Ltd.)".

It is possible to achieve insolubilization of the dry salts by adding the coagulant 78 such as the iron oxide, the aluminum compound, or the polymer coagulant.

In addition, when the iron (III) hydroxide is charged as the coagulant 78, it can react with selen to achieve insolubilization. For example, when the polyaluminum chloride (PAC) is charged, it can react with, for example, arsenic to achieve insolubilization.

In addition, when the polymer coagulant is charged, it can react with, for example, lead or cadmium to achieve insolubilization.

According to the present embodiment, since the dry salts generated in the spray drying apparatus 50 are subjected to the immobilization treatment by further adding and mixing the coagulant 78 such as the iron oxide, the aluminum compound, or the polymer coagulant together with the immobilization aid 73 such as soot and dust and cement materials and the chelating agent 74 or instead of the chelating agent 74, it is possible to immobilize the heavy metals and to perform an elution prevention (insolubilization) treatment.

Thus, the dry salts dried by the spray drying apparatus 50 are separated by the solid content separator 70 and the dry salts are immobilized, so that the insolubilization treatment is reliably performed. Accordingly, even when the dry matter 77 is subjected to the landfill treatment, the dissolution of the dry salts is reduced and the soil contamination due to the elution of the hazardous substance can be prevented.

Figure 5:
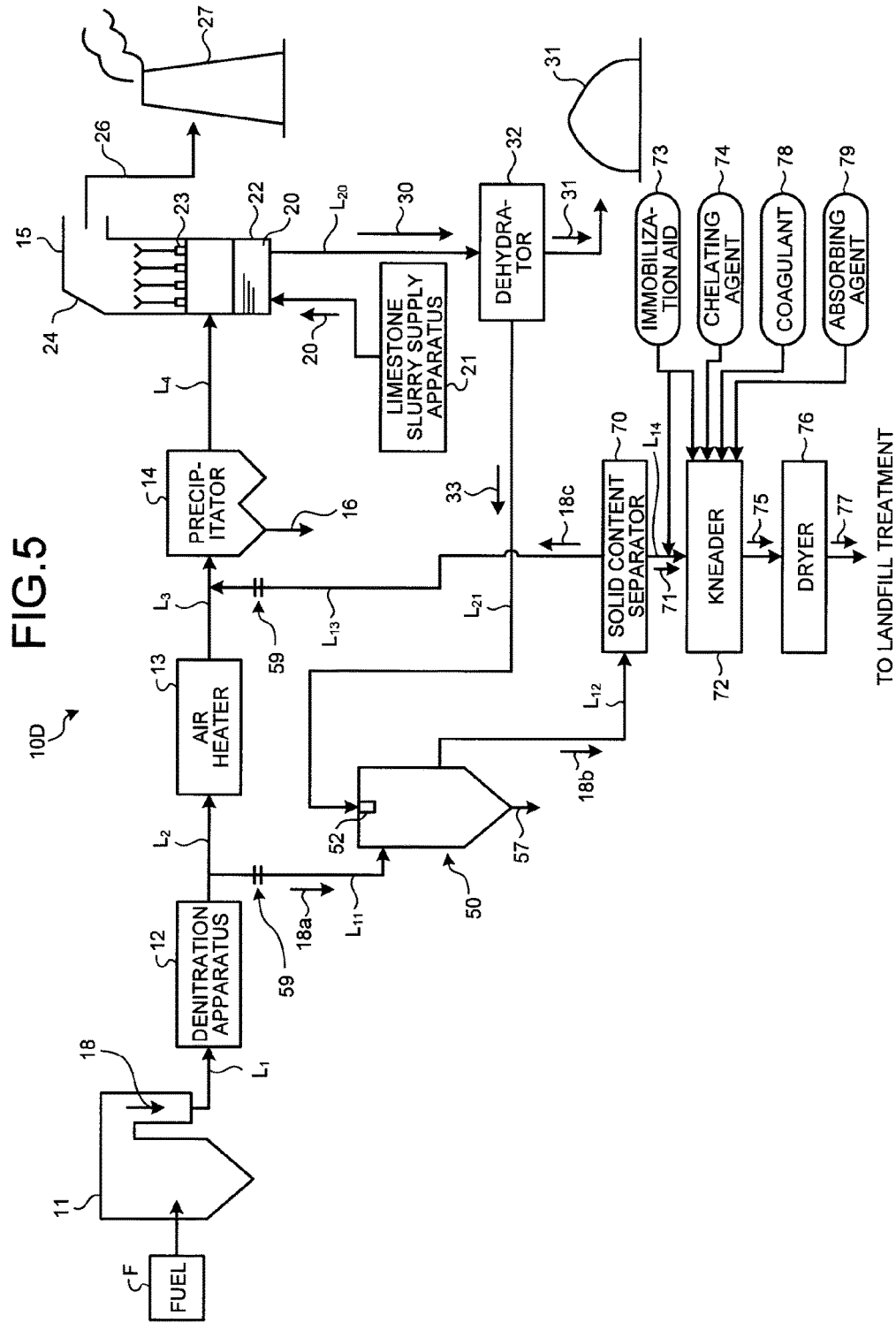
FIG. 5 is a schematic configuration diagram of another air pollution control system according to the second embodiment.

FIG. 5 is a schematic configuration diagram of another air pollution control system according to the second embodiment.

In an air pollution control system 10D illustrated in FIG. 5, as in the air pollution control system 10C, the coagulant 78 is added and an absorbing agent 79 such as an activated carbon is also charged, so that heavy metal materials such as mercury can be absorbed and removed.

Third Embodiment

Figure 6:
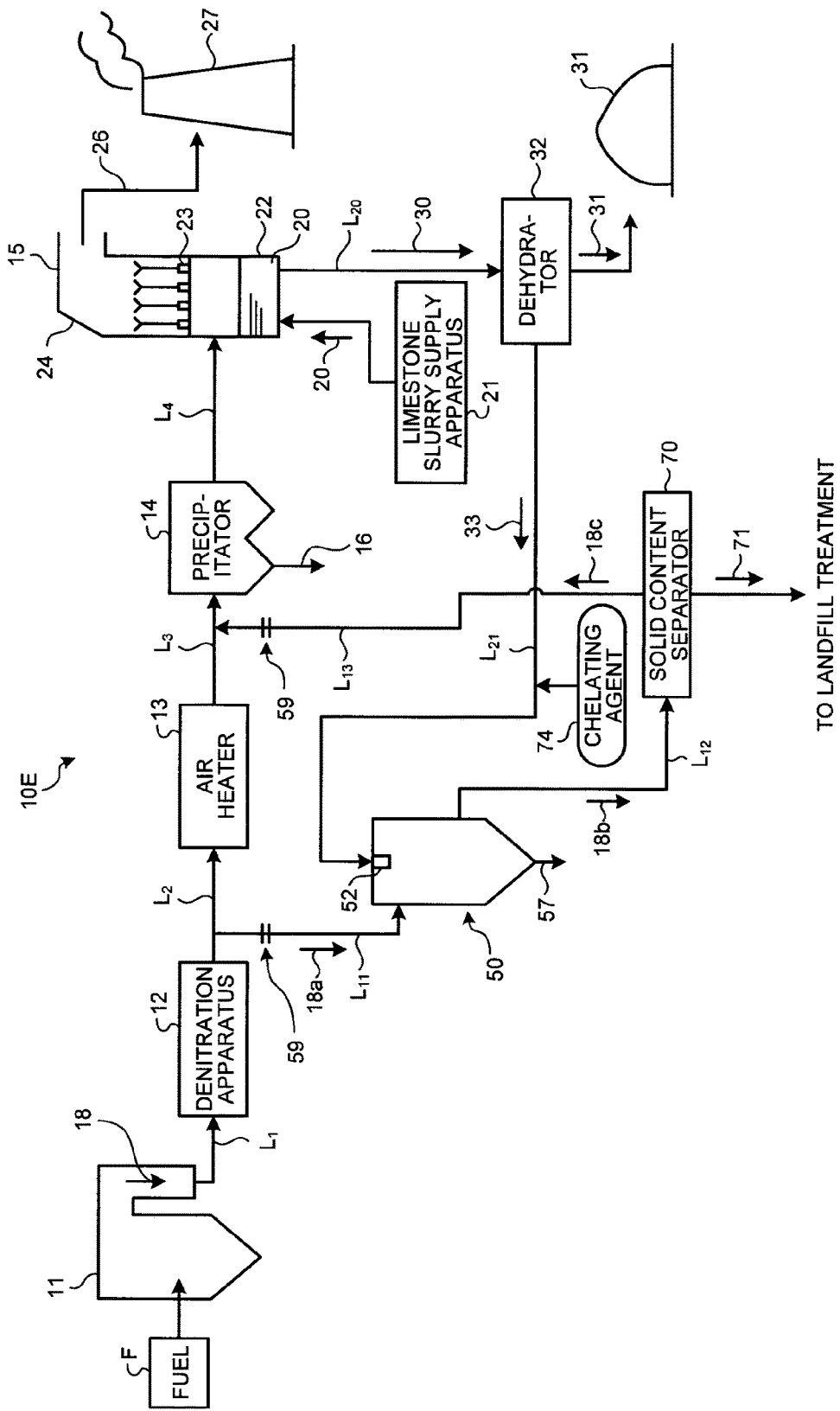
FIG. 6 is a schematic configuration diagram of an air pollution control system according to a third embodiment.
Figure 7:
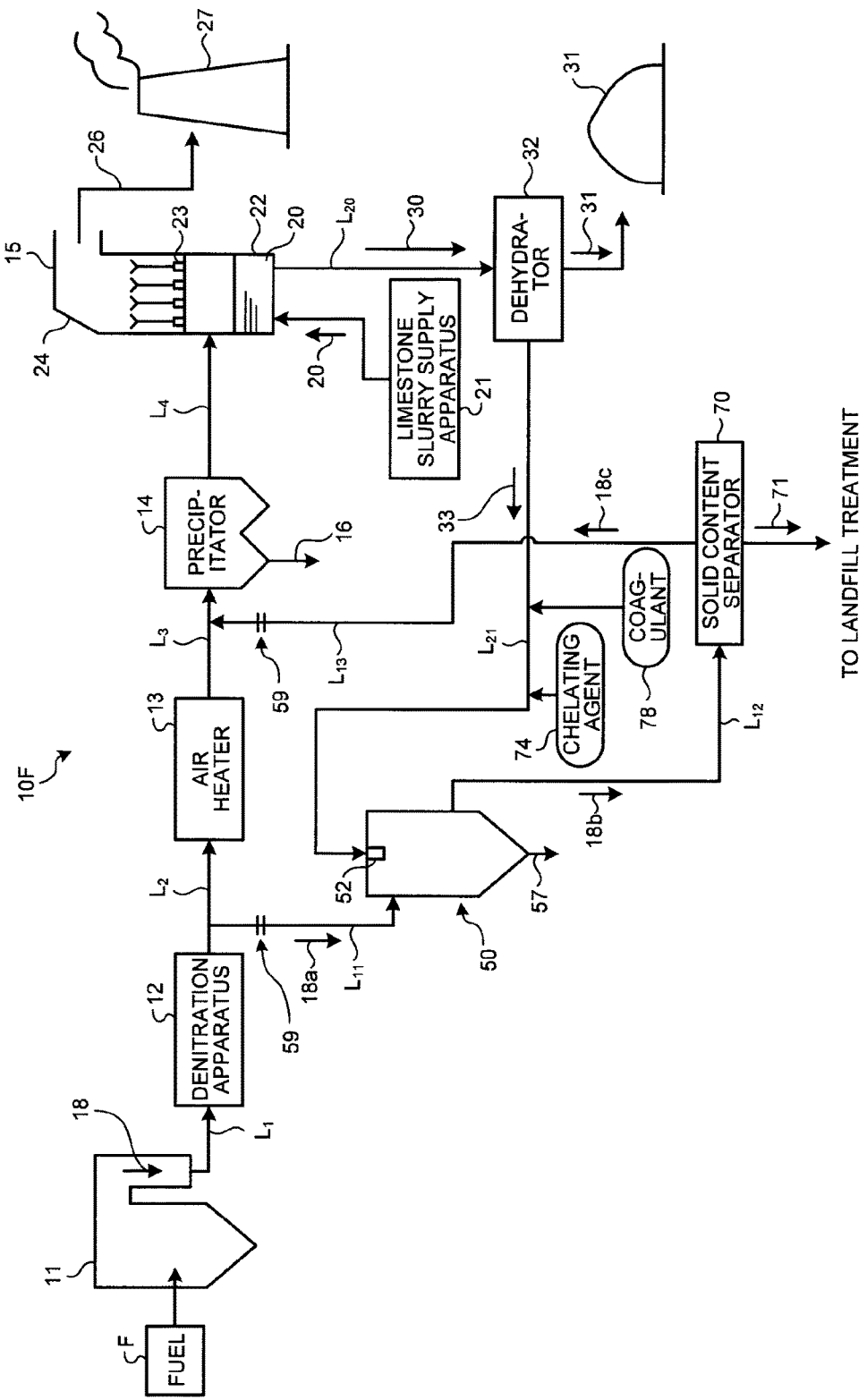
FIG. 7 is a schematic configuration diagram of another air pollution control system according to the third embodiment.

FIG. 6 is a schematic configuration diagram of an air pollution control system according to a third embodiment. FIG. 7 is a schematic configuration diagram of another air pollution control system according to the third embodiment. The same members as those in the air pollution control system according to the first and second embodiments are denoted by the same reference numerals and the description thereof will not be presented.

In an air pollution control system 10E according to the present embodiment illustrated in FIG. 6, a chelating agent 74 is added to a filtrate introduction line $L_{21}$ through which filtrate 33 discharged from a dehydrator 32 is supplied to a spray drying apparatus 50 to immobilize heavy metals contained in the filtrate 33.

In the present embodiment, the chelating agent 74 is mixed into the filtrate 33 before the filtrate is supplied to the spray drying apparatus 50, so that dry salts contained in a flue gas 18b generated by the spray drying apparatus 50 sufficiently mix with the chelating agent 74. Thus, since the chelating agent 74 is added before solid contents 71 is recovered by a solid content separator 70, it is not necessary to mix using a kneader 72 as illustrated in FIG. 4 and it is possible to simplify facilities.

According to the present embodiment, after the chelating agent 74 for immobilizing the heavy metals contained in the filtrate 33 is added, the elution of the heavy metals such as mercury from the solid contents 71 can be prevented by the drying in the spray drying apparatus 50.

In addition, as in an air pollution control system 10F illustrated in FIG. 7, a coagulant 78 may be added together with or instead of the chelating agent 74.

Here, an example of the coagulant 78 may include a sulfate band, an iron chloride, a PAC, or a polymer coagulant. In addition, an example of the polymer coagulant may include a "TAKIFLOC (trade name; manufactured by Taki Chemical Co., Ltd.) anionic, nonionic, cationic, or amphoteric)" and an "EPOFLOCK L-1 (trade name; manufactured by JIKCO Ltd.)".

Fourth Embodiment

Figure 8:
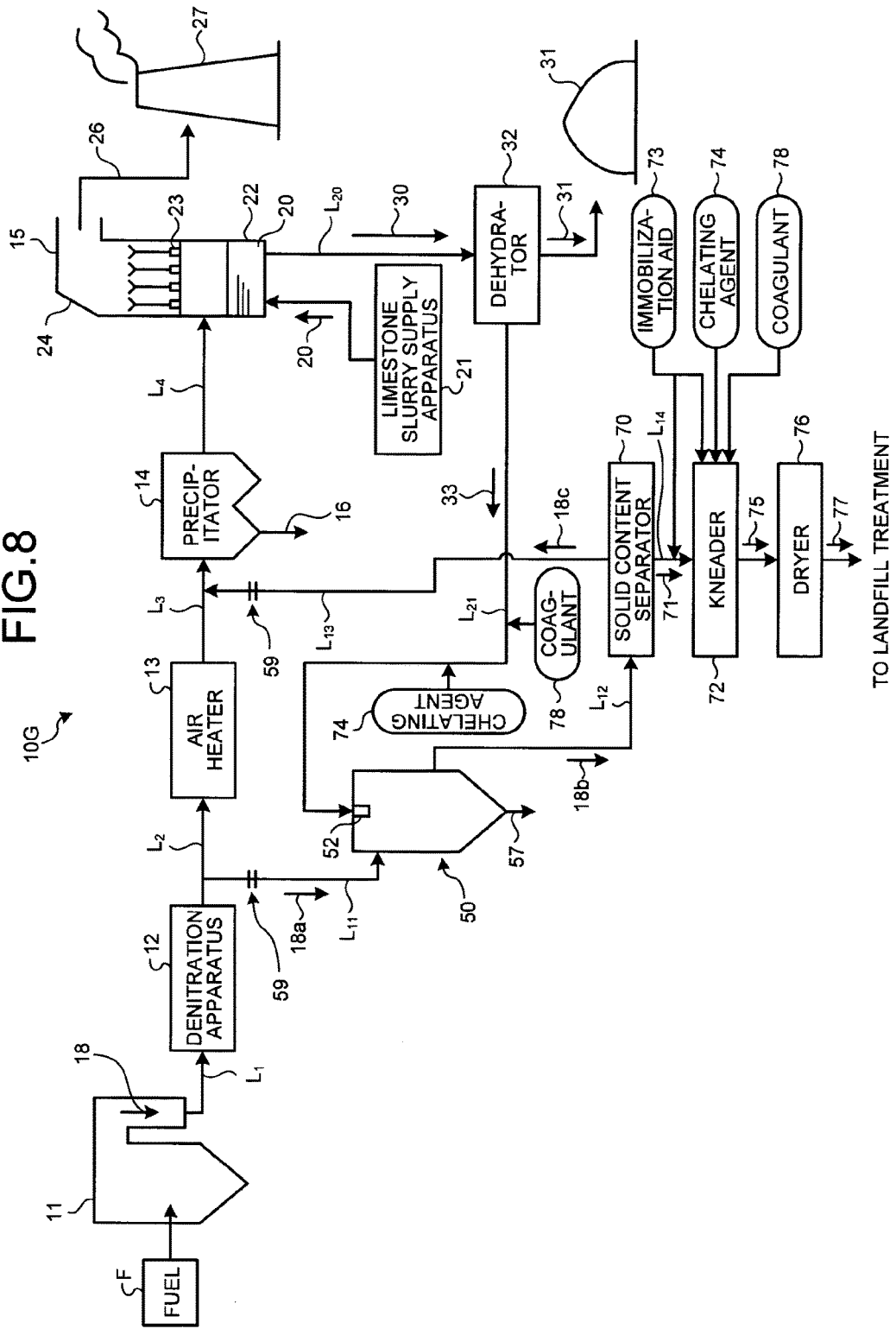
FIG. 8 is a schematic configuration diagram of an air pollution control system according to a fourth embodiment.

FIG. 8 is a schematic configuration diagram of an air pollution control system according to a fourth embodiment. The same members as those in the air pollution control system according to the first to third embodiments are denoted by the same reference numerals and the description thereof will not be presented.

An air pollution control system 10G according to the present embodiment illustrated in FIG. 8 is configured to perform a treatment of adding an immobilization aid 73 for immobilizing solid contents 71 on a rear stream side of a spray drying apparatus 50 in combination with a treatment of previously immobilizing heavy metals by adding a chelating agent 74 on a front stream side of the spray drying apparatus 50.

In the air pollution control system 10G according to the present embodiment, the chelating agent 74 and a coagulant 78 are added to a filtrate introduction line $L_{21}$ through which filtrate 33 discharged from a dehydrator 32 is supplied to the spray drying apparatus 50 to immobilize heavy metals contained in the filtrate 33, an immobilization aid 73 is added to the solid contents 71 after the separation of the solid content separator 70, and the chelating agent 74 and the coagulant 78 are added to a kneader 72.

In addition, an absorbing agent 79 such as activated carbon may be added to each of front and rear of the spray drying apparatus 50.

As a result, the heavy metals such as mercury contained in the filtrate 33 are immobilized at the time of spray-drying and are further immobilized using the immobilization aid 73 after being separated as the solid contents 71, so that it is possible to prevent re-dissolution of dry salts at the time of a landfill treatment.

Fifth Embodiment

FIG. 9 is a schematic configuration diagram of an air pollution control system according to a fifth embodiment. The same members as those in the air pollution control system according to the first to fourth embodiments are denoted by the same reference numerals and the description thereof will not be presented.

In an air pollution control system 10H according to the present embodiment illustrated in FIG. 9, a chelating agent 74 is added to absorbent slurry 30 on a front stream side of a spray drying apparatus 50 and a front stream side of a dehydrator 32. Then, it is configured to use in combination with a treatment of previously immobilizing heavy metals contained in the absorbent slurry 30 by adding the chelating agent 74.

In the air pollution control system 10H according to the present embodiment, the absorbent slurry 30 on the front stream side of the dehydrator 32 is added with the chelating agent 74 for immobilizing the heavy metals and a coagulant 78 as necessary, and the immobilized heavy metals together with gypsum 31 can be removed by the dehydrator 32.

Furthermore, in the present embodiment, an absorbing agent 79 such as activated carbon may be added to the front stream side of the dehydrator 32.

As a result, the concentration of the heavy metals such as mercury contained in the filtrate 33 are lowered at the time of spray-drying, so that it is possible to prevent re-dissolution of dry salts at the time of a landfill treatment.

The invention claimed is:

1. An air pollution control system configured to treat a flue gas discharged from a boiler which combusts a fuel comprising:
   an air heater that is configured to recover heat of the flue gas;
   a precipitator that is provided on the downstream of the air heater and configured to remove soot and dust contained in the flue gas;

a desulfurization apparatus that is arranged on the downstream of the precipitator and configured to remove sulfur oxides contained in the flue gas after removing the soot and dust, using an absorbent;

a dehydrator that is provided on the downstream of the desulfurization apparatus and configured to remove gypsum from absorbent slurry discharged from the desulfurization apparatus;

a spray drying apparatus that is provided with a spray unit which is configured to spray filtrate discharged from the dehydrator;

a flue gas introduction line which partially branches the flue gas from a main flue gas duct on the upstream of the air heater through which the branched flue gas is introduced to the spray drying apparatus;

a flue gas supply line which is provided between the downstream of the spray drying apparatus and the main flue gas duct between the air heater and the precipitator and through which the flue gas from the spray drying apparatus returns to the main flue gas duct;

a solid content separator that is provided in the flue gas supply line between the downstream of the spray drying apparatus and the main flue gas duct between the air heater and the precipitator and configured to perform a solid-gas separation on soluble dry salts contained in the flue gas from the spray drying apparatus;

a kneader that is provided on the downstream of the solid content separator and configured to perform kneading and immobilizing treatment on the separated soluble dry salts together with an immobilization aid; and a dryer that is provided on the downstream of the kneader and configured to perform a drying treatment on a kneaded matter.

2. The air pollution control system according to claim 1, wherein the immobilization aid is any one or a mixture of collected dust ash, calcium oxide, calcium carbonate, calcium sulfate, or a cement material.

3. The air pollution control system according to claim 2, wherein at least one of a chelating agent, a coagulant, or an absorbing agent is added together with or instead of the immobilization aid.

4. The air pollution control system according to claim 3, wherein at least one of the chelating agent and the coagulant is supplied to a filtrate introduction line which connects the dehydrator to the spray drying apparatus.

* * * * *